United States Patent
Saarnivala et al.

(10) Patent No.: US 12,075,525 B2
(45) Date of Patent: Aug. 27, 2024

(54) TEMPLATE-BASED REGISTRATION

(71) Applicants: ARM IP LIMITED, Cambridge (GB); ARM LIMITED, Cambridge (GB)

(72) Inventors: Mikko Johannes Saarnivala, Oulu (FI); Szymon Sasin, Oulu (FI); Yongbeom Pak, Oulu (FI); Hannes Tschofenig, Tirol (AT)

(73) Assignees: ARM IP LIMITED, Cambridge (GB); ARM LIMITED, Cambridge (GB)

( * ) Notice: Subject to any disclaimer, the term of this patent is extended or adjusted under 35 U.S.C. 154(b) by 354 days.

(21) Appl. No.: 17/310,332

(22) PCT Filed: Jan. 9, 2020

(86) PCT No.: PCT/GB2020/050043
§ 371 (c)(1),
(2) Date: Jul. 28, 2021

(87) PCT Pub. No.: WO2020/157449
PCT Pub. Date: Aug. 6, 2020

(65) Prior Publication Data
US 2022/0109980 A1 Apr. 7, 2022

(30) Foreign Application Priority Data
Feb. 1, 2019 (GB) .................................. 1901416

(51) Int. Cl.
*H04W 8/24* (2009.01)
*H04W 4/70* (2018.01)
(Continued)

(52) U.S. Cl.
CPC .............. *H04W 8/245* (2013.01); *H04W 4/70* (2018.02); *H04W 8/02* (2013.01); *H04W 28/18* (2013.01); *H04W 60/00* (2013.01)

(58) Field of Classification Search
CPC ......... H04W 8/245; H04W 4/70; H04W 8/02; H04W 28/18; H04W 60/00
See application file for complete search history.

(56) References Cited

U.S. PATENT DOCUMENTS 5,349,643 A 9/1994 Cox et al.
5,872,968 A 2/1999 Knox et al.
(Continued)

FOREIGN PATENT DOCUMENTS

CN 109218142 A 1/2019
EP 2466791 A1 6/2012
(Continued)

OTHER PUBLICATIONS

Application and File history for U.S. Appl. No. 14/842,065, filed Sep. 1, 2015, Inventors: Sasin, et al.
(Continued)

*Primary Examiner* — Ernest G Tacsik
(74) *Attorney, Agent, or Firm* — DeWitt LLP

(57) ABSTRACT

Broadly speaking, the present techniques relate to a computer implemented method for enabling template-based registration, the method performed by an intermediary apparatus in communication with a first device and a server, the method comprising: receiving, from the first device, a registration request comprising one or more device identifiers for the first device; determining the availability of template information for the first device based on or in response to the one or more device identifiers; when the template information for the first device is unavailable: generating template information for the first device; or requesting, from the server, the template information.

20 Claims, 12 Drawing Sheets

(51) Int. Cl.
*H04W 8/02* (2009.01)
*H04W 28/18* (2009.01)
*H04W 60/00* (2009.01)

(56) References Cited

U.S. PATENT DOCUMENTS

| | | | |
|---|---|---|---|
| 6,463,535 | B1 | 10/2002 | Drews |
| 6,950,660 | B1 | 9/2005 | Hsu et al. |
| 7,363,514 | B1 | 4/2008 | Behren |
| 7,882,345 | B1 | 2/2011 | Christensen |
| 7,971,045 | B1 | 6/2011 | Currid et al. |
| 8,244,845 | B2 | 8/2012 | Rao |
| 8,370,491 | B1 | 2/2013 | Breau et al. |
| 9,064,117 | B1 | 6/2015 | Worsley |
| 10,091,278 | B1* | 10/2018 | Garlapati ............... H04W 4/70 |
| 10,554,731 | B2 | 2/2020 | Pak et al. |
| 2005/0010758 | A1 | 1/2005 | Landrock et al. |
| 2006/0075242 | A1 | 4/2006 | Aissi et al. |
| 2006/0161778 | A1* | 7/2006 | Stirbu ............... H04N 21/4126 713/320 |
| 2007/0043608 | A1 | 2/2007 | May et al. |
| 2007/0220266 | A1 | 9/2007 | Cooper et al. |
| 2009/0129597 | A1 | 5/2009 | Zimmer et al. |
| 2009/0210898 | A1* | 8/2009 | Childress ............... H04H 60/66 455/418 |
| 2009/0276620 | A1 | 11/2009 | Mccarron et al. |
| 2010/0165877 | A1 | 7/2010 | Shukla et al. |
| 2012/0079031 | A1 | 3/2012 | Matthews et al. |
| 2013/0160094 | A1 | 6/2013 | Luo |
| 2013/0226998 | A1* | 8/2013 | Heo ............... H04L 67/01 709/203 |
| 2013/0227036 | A1* | 8/2013 | Kang ............... H04W 4/12 709/206 |
| 2013/0324121 | A1* | 12/2013 | Kwon ............... H04W 4/70 455/435.1 |
| 2014/0006586 | A1 | 1/2014 | Hong et al. |
| 2014/0025742 | A1* | 1/2014 | Ukkola ............... H04W 60/04 709/204 |
| 2014/0089652 | A1 | 3/2014 | Cerri et al. |
| 2014/0330952 | A1 | 11/2014 | Starsinic et al. |
| 2015/0071139 | A1 | 3/2015 | Nix |
| 2015/0296470 | A1 | 10/2015 | Kim et al. |
| 2015/0304798 | A1* | 10/2015 | Yang ............... H04W 60/06 370/331 |
| 2015/0305008 | A1 | 10/2015 | Kim et al. |
| 2015/0319263 | A1 | 11/2015 | Koch et al. |
| 2015/0358824 | A1 | 12/2015 | Kim et al. |
| 2016/0065556 | A1 | 3/2016 | Sasin et al. |
| 2016/0072808 | A1 | 3/2016 | David et al. |
| 2016/0212262 | A1* | 7/2016 | Klempf ............... H04M 3/42068 |
| 2016/0337453 | A1 | 11/2016 | Lee |
| 2017/0039373 | A1 | 2/2017 | Sasin et al. |
| 2017/0041287 | A1 | 2/2017 | Pak et al. |
| 2017/0094592 | A1 | 3/2017 | Tabatabaei et al. |
| 2017/0099332 | A1 | 4/2017 | Bullotta et al. |
| 2017/0289806 | A1 | 10/2017 | Girdhar et al. |
| 2017/0295503 | A1 | 10/2017 | Govindaraju et al. |
| 2018/0007055 | A1* | 1/2018 | Infante-Lopez ......... H04W 4/80 |
| 2018/0217966 | A1 | 8/2018 | Buttolo et al. |
| 2019/0036727 | A1* | 1/2019 | Matson ............... H04L 63/1441 |
| 2019/0036875 | A1* | 1/2019 | Jiménez ............... H04L 61/5014 |
| 2019/0095644 | A1 | 3/2019 | Park et al. |
| 2020/0099621 | A1* | 3/2020 | Oda ............... H04W 4/70 |
| 2020/0204637 | A1* | 6/2020 | Wang ............... H04W 4/70 |
| 2020/0218793 | A1 | 7/2020 | Storm et al. |
| 2021/0120406 | A1* | 4/2021 | Ocak ............... G06F 9/4416 |
| 2021/0297309 | A1* | 9/2021 | Zhang ............... H04L 12/2803 |
| 2021/0342163 | A1* | 11/2021 | Ocak ............... H04L 47/82 |
| 2022/0103634 | A1 | 3/2022 | Saarnivala et al. |

FOREIGN PATENT DOCUMENTS

| | | | |
|---|---|---|---|
| EP | 3402164 | A1 | 11/2018 |
| GB | 2533385 | A | 6/2016 |
| KR | 20140113007 | A | 9/2014 |
| WO | WO-0169888 | A1 | 9/2001 |
| WO | WO-2006059195 | A1 | 6/2006 |
| WO | WO-2009141493 | A1 | 11/2009 |
| WO | WO-2014048236 | A1 | 4/2014 |
| WO | WO-2014069968 | A1 | 5/2014 |
| WO | WO-2014114354 | A1 | 7/2014 |
| WO | WO-2014182674 | A1 | 11/2014 |
| WO | WO-2014190177 | A1 | 11/2014 |
| WO | WO-2015042370 | A1 | 3/2015 |
| WO | WO-2015065913 | A1 | 5/2015 |

OTHER PUBLICATIONS

Application and File history for U.S. Appl. No. 15/226,523, filed Aug. 2, 2016, Inventors: Sasin, et al.

Application and File History for U.S. Appl. No. 17/310,332, filed Jul. 28, 2021, Inventor: Saarnivala et al.

Combined Search and Examination Report for Great Britain Application No. GB1806259.6, mailed Jul. 12, 2018, 6 pages.

Combined Search and Examination Report for Great Britain Application No. GB1901416.6, mailed Aug. 1, 2019, 6 pages.

Combined Search and Examination Report under Section 17 and 18(3) for Great Britain Application No. GB1513748.2, mailed Mar. 17, 2016, 7 pages.

Combined Search and Examination Report under Sections 17 and 18(3) for Great Britain Application No. 1901414.1, mailed Aug. 16, 2019, 7 pages.

Combined Search and Examination Report under Sections 17 and 18(3) for Great Britain Application No. 1901417.4, mailed Aug. 1, 2019, 6 pages.

Combined Search and Examination Report under Sections 17 and 18(3) for Great Britain Application No. GB1513750.8, mailed on Mar. 17, 2016, 6 pages.

Examination Report for GB Application No. 1513748.2, mailed on Nov. 29, 2019, 7 pages.

Examination Report for GB Application No. 1901416.6 mailed on Apr. 22, 2021, 3 pages.

Examination Report for GB Application No. 1901416.6 mailed on Aug. 19, 2020, 3 pages.

Examination Report under Section 18(3) for Application No. GB1513750.8, mailed on Nov. 10, 2017, 3 pages.

Examination Report under section 18(3) for GB Application No. 1901414.1, mailed on Apr. 16, 2021, 4 pages.

Examination Report under section 18(3) for GB Application No. 1901414.1, mailed on Aug. 19, 2020, 3 pages.

Examination Report under section 18(3) for GB Application No. 1901417.4, mailed on Aug. 13, 2020, 4 pages.

Examination Report under section 18(3) for GB Application No. 1901417.4, mailed on Dec. 22, 2020, 3 pages.

International Preliminary Report on Patentability and Written Opinion for Application No. PCT/GB2020/050042, mailed on Aug. 12, 2021, 9 pages.

International Preliminary Report on Patentability and Written Opinion for Application No. PCT/GB2020/050044, mailed on Aug. 12, 2021, 9 pages.

International Preliminary Report on Patentability and Written Opinion for Application No. PCT/GB020/050043, mailed Jul. 27, 2021, 8 pages.

International Search Report and Written Opinion for Application No. PCT/GB2020/050043 mailed Mar. 17, 2020, 13 pages.

International Search Report and Written Opinion for Application No. PCT/GB2020/050042, mailed on Mar. 23, 2020, 14 pages.

International Search Report and Written Opinion for Application No. PCT/GB2020/050044, mailed on Mar. 23, 2020, 17 pages.

Klas G., et al., "Lightweight M2M: Enabling Device Management and Applications for the Internet of Things," White Paper, Vodafone, Arm and Ericsson, Feb. 26, 2014, 16 pages.

"Lightweight Machine to Machine Technical Specification: Core," Open Mobile Alliance, Version 1.1, Retrieved from http://openmobilealliance.org/RELEASE/Lightweight/M2M/V1_1-20180612-C/OMA-TS-LightweightM2M_Core-V1_1-20180612-C.pdf on Mar. 13, 2019, Jun. 12, 2018, 23 pages.

(56) References Cited

OTHER PUBLICATIONS

Panwar M., et al., "Security for IoT: An Effective DTLS with Public Certificates," 2015 International Conference on Advances in Computer Engineering and Applications (ICACEA), IEEE, Mar. 2015, pp. 163-166.
Schukat M., et al., "Public Key Infrastructures and Digital Certificates for the Internet of Things," IEEE 2015, 26th Irish Signals and Systems Conference (ISSC), Jun. 2015, 5 pages.
Search Report under Section 17(5) mailed on Jan. 12, 2015 for GB Application No. 1415562.6 , 5 pages.
China Office Action corresponding to CN 202080009365.4 dated May 29, 2023, 11 pages.
English Translation of China Office Action corresponding to CN 202080009365.4 dated May 29, 2023, 11 pages.

\* cited by examiner

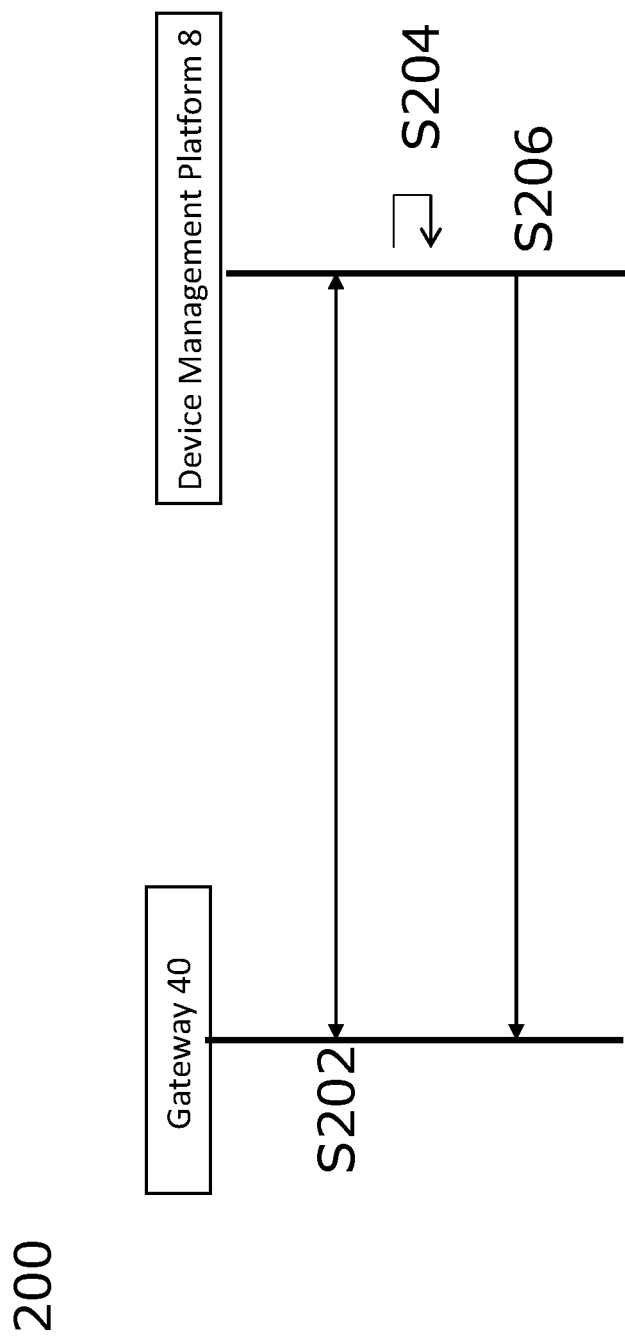

TEMPLATE-BASED REGISTRATION

The present techniques generally relate to template-based registration of a device to enable the device to access a server or service.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a computer implemented method for enabling template-based registration, the method performed by an intermediary apparatus in communication with a first device and a server, the method comprising: receiving, from the first device, a registration request comprising one or more device identifiers for the first device; determining the availability of template information for the first device based on or in response to the one or more device identifiers; when the template information for the first device is unavailable: generating template information for the first device; or requesting, from the server, the template information.

According to a further technique there is provided a computer implemented method comprising: receiving, at a server from an intermediary apparatus, a request for template information for a first device type to enable the intermediary apparatus register devices corresponding to the first device type in a template-based registration; determining, at the server, whether the intermediary apparatus can be provided with the template information; responsive to a determination that the edge apparatus can be provided with the requested template information, transmitting the requested template information to the edge apparatus.

According to a further technique there is provided a system comprising: a device; a server; and an intermediary apparatus; wherein the intermediary device is to receive, from the device, a registration request comprising one or more device identifiers for the device; determine the availability of template information for the device based on or in response to the one or more device identifiers; when the template information for the device is unavailable: generate template information for the first device; or request, from the server, the template information.

The techniques are diagrammatically illustrated, by way of example, in the accompanying drawings, in which.

Figure 3:
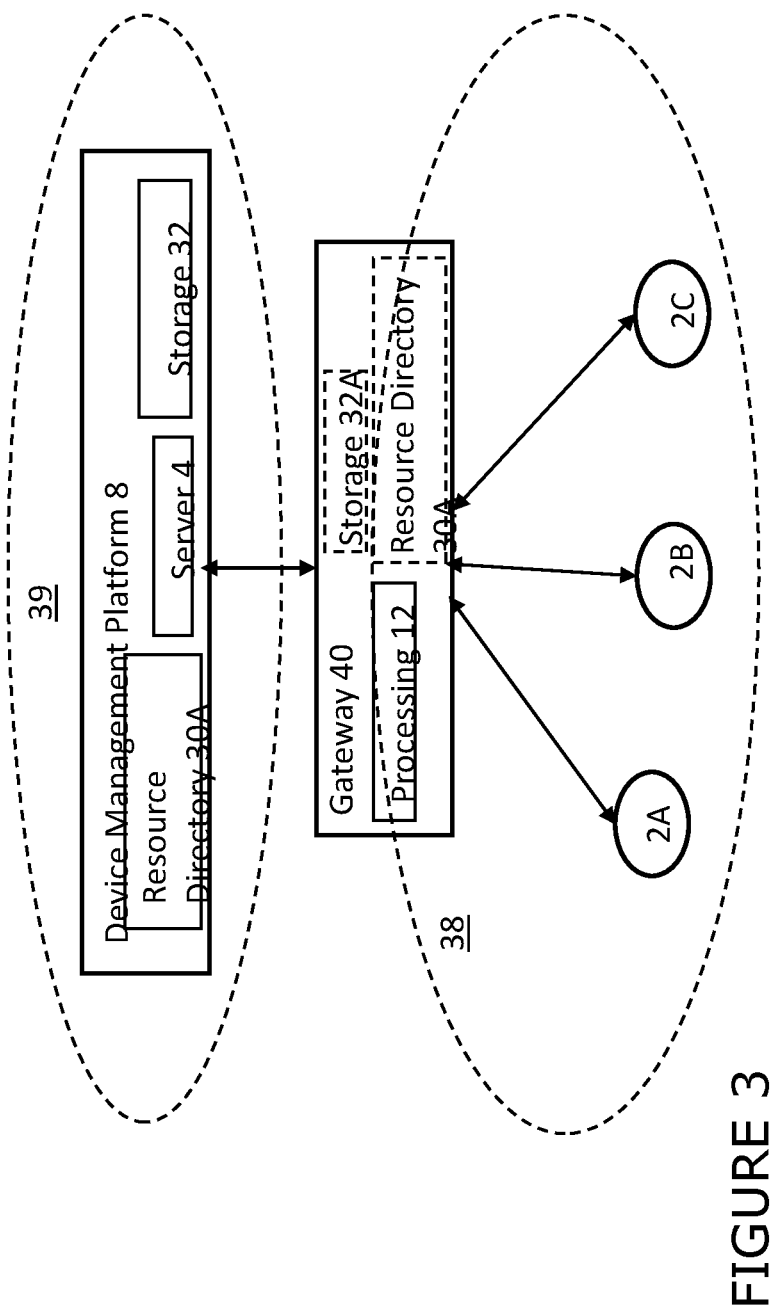
Figure 5A:
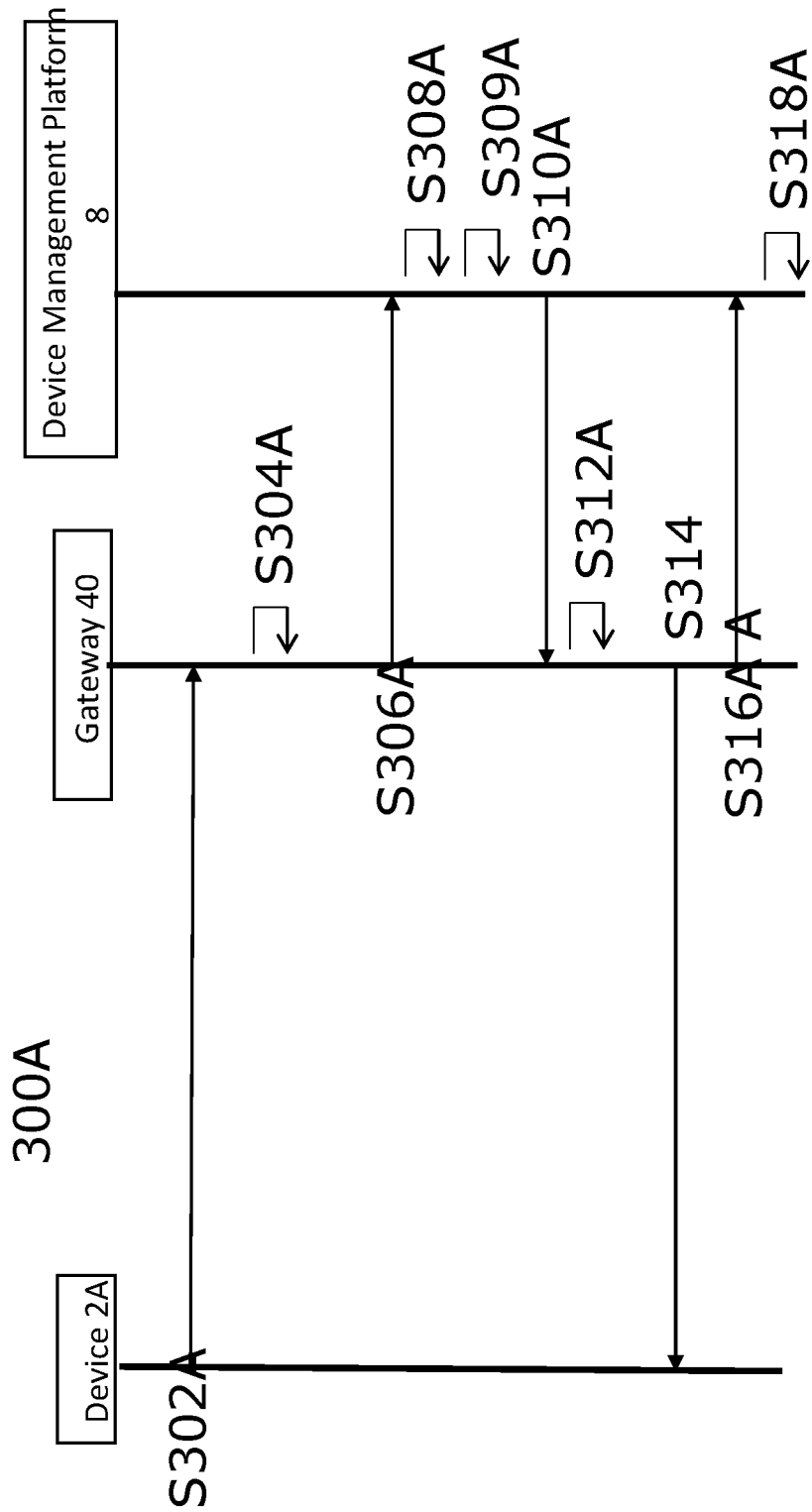
Figure 5B:
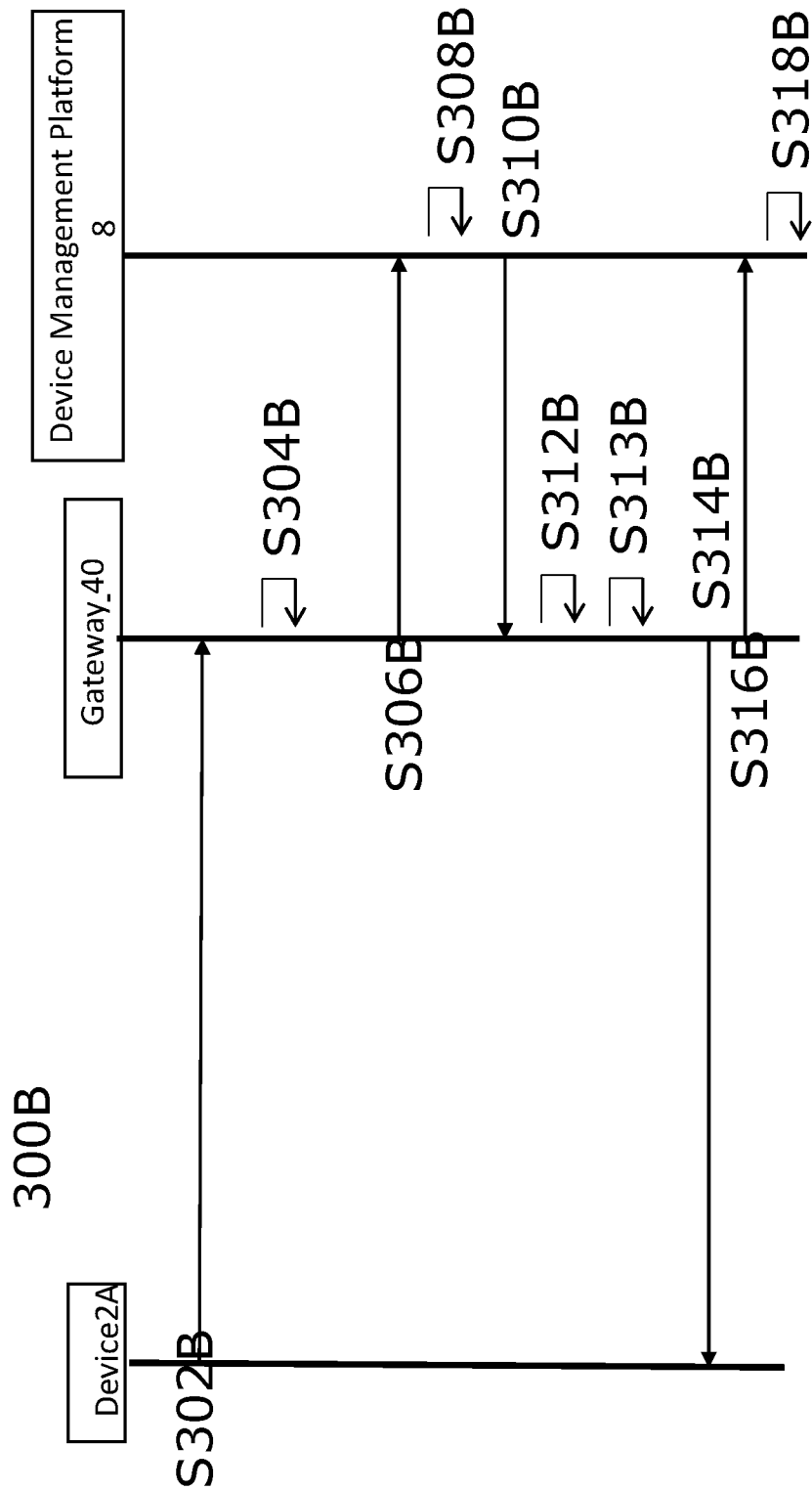
Figure 6:
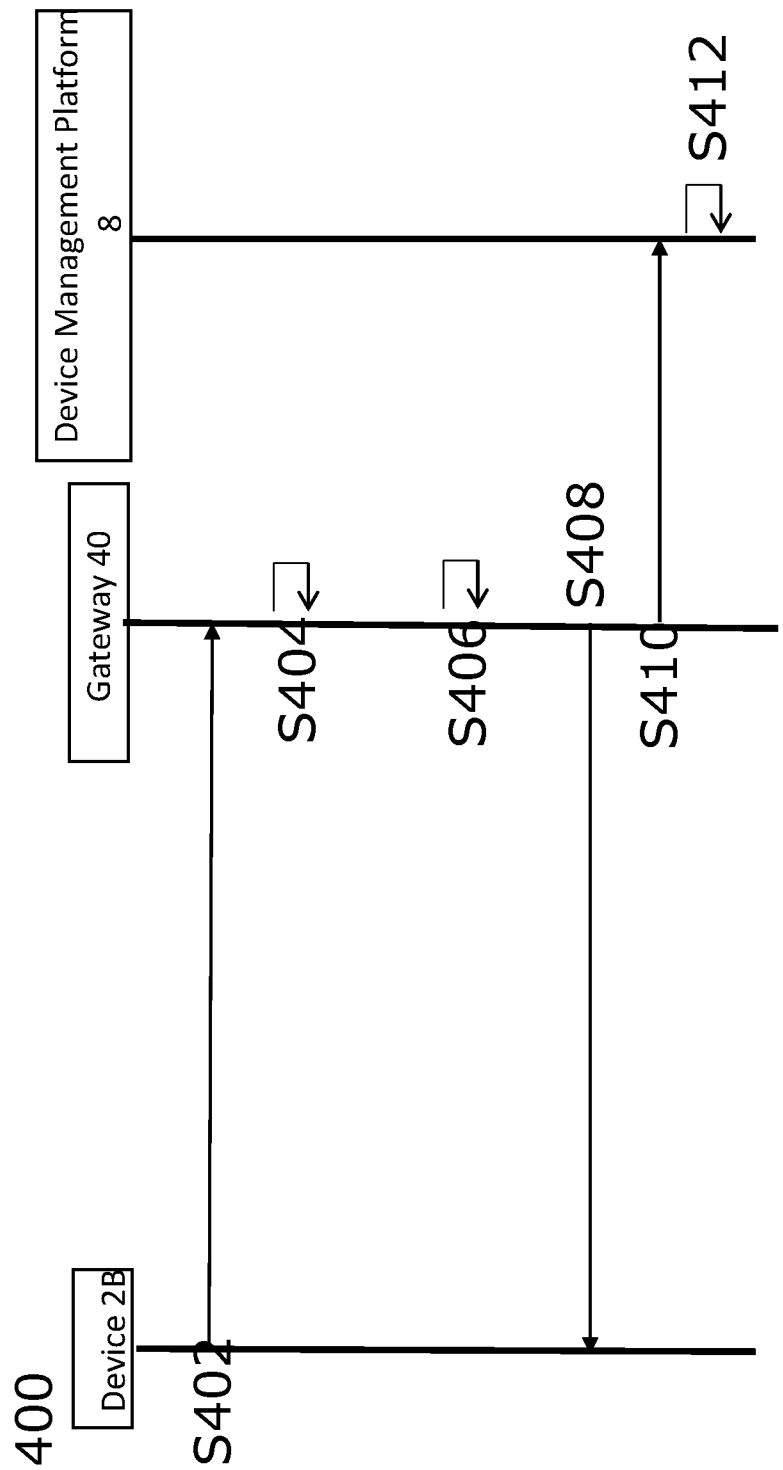
Figure 7:
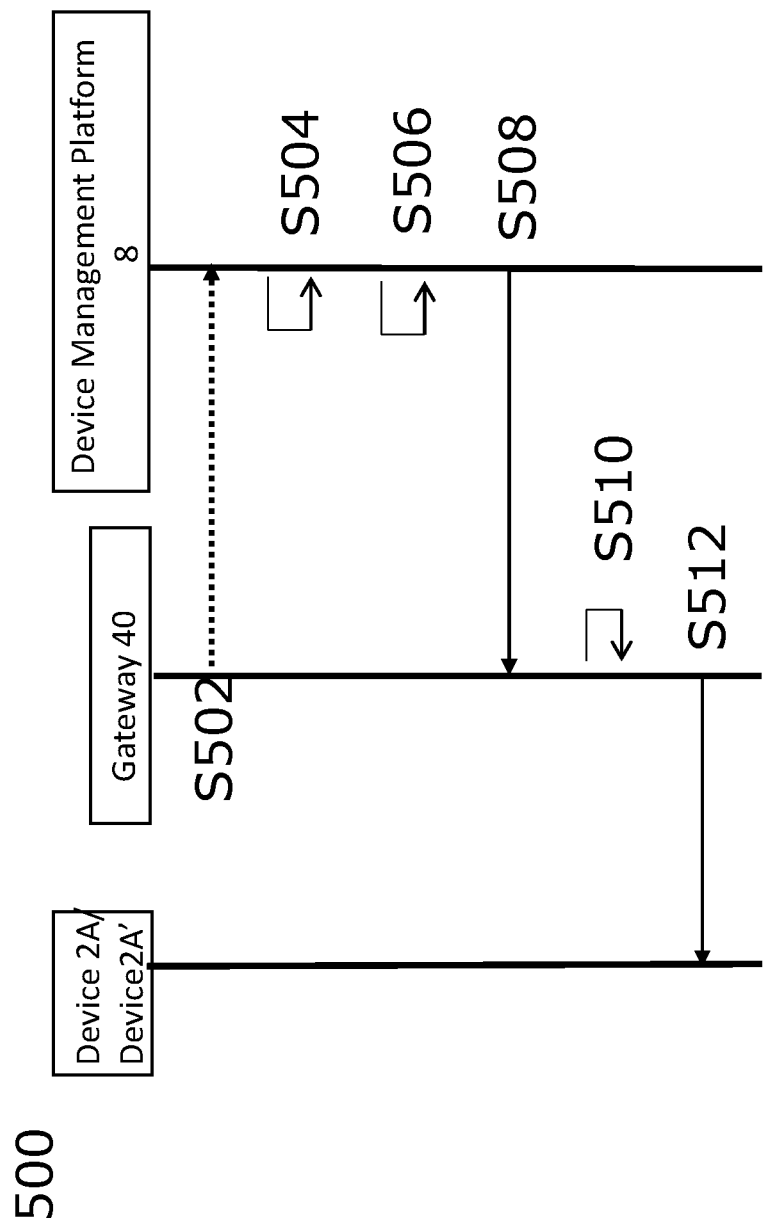
Figure 8A:
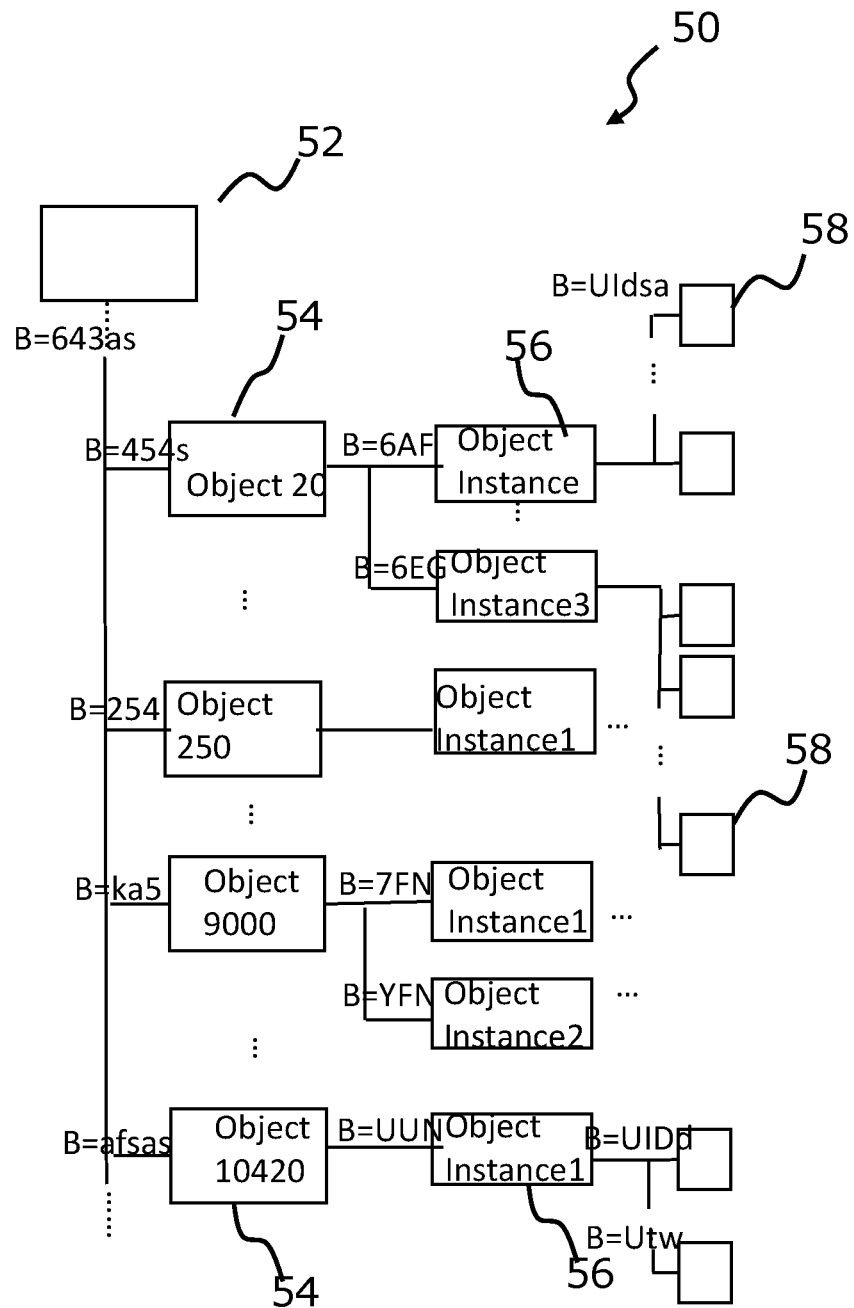
Figure 8B:
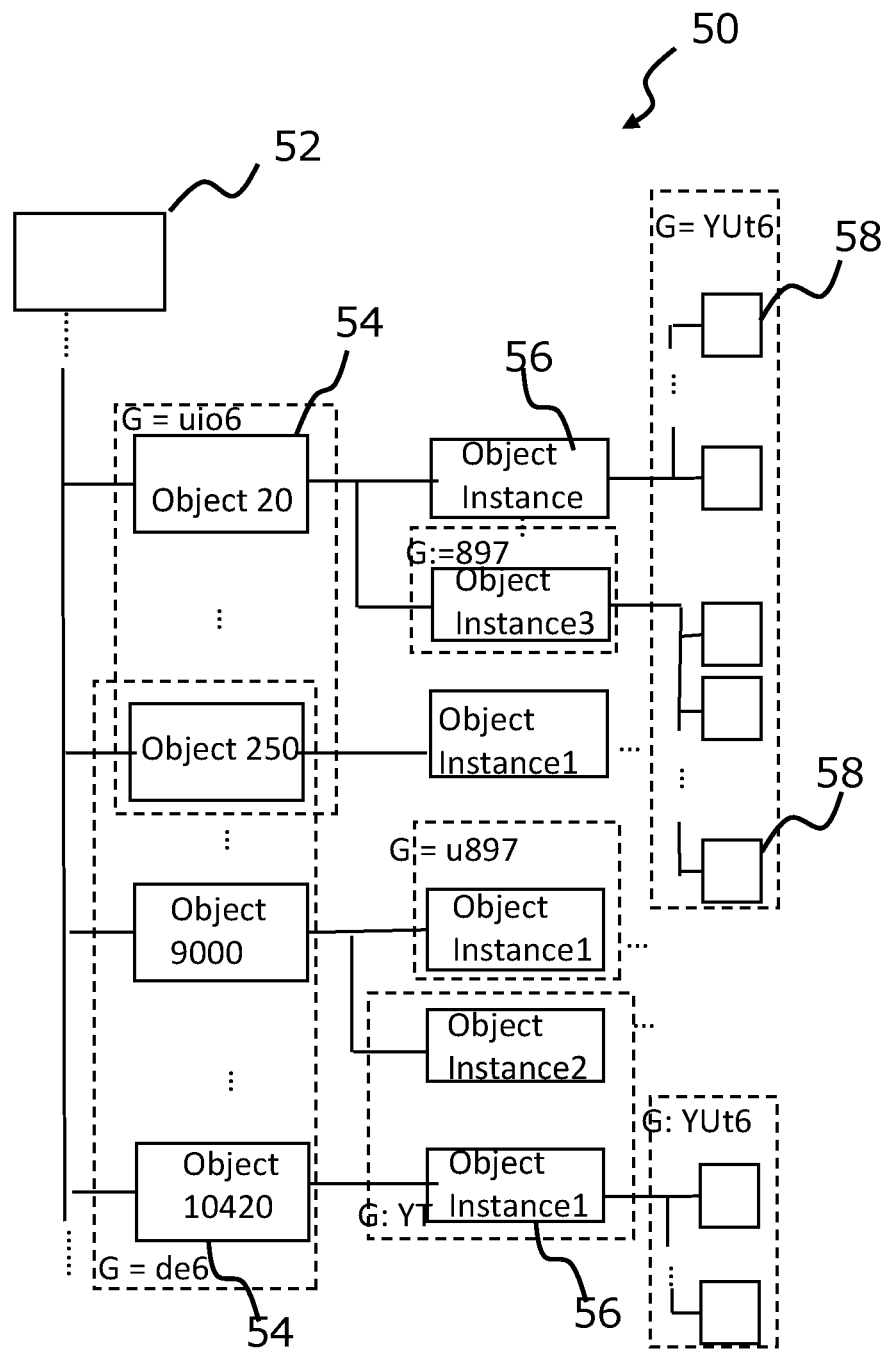

2c shows one simplified example of a portion of an object hierarchy;

FIG. 3 shows an example of an intermediary apparatus between devices and a device management platform;

FIG. 4 shows an example of an intermediary apparatus registering with the device management platform;

FIGS. 5a & 5b show examples of a registration process between a device and the intermediary apparatus;

FIG. 6 shows an example of a registration process between a client device and the intermediary apparatus;

FIG. 7 shows an example process of the device management platform provisioning template information on the intermediary apparatus;

FIGS. 8a and 8b illustratively show an example of a data structure which can be used by the server to identify object(s), object instance(s) and resource(s) of one or more resource templates.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
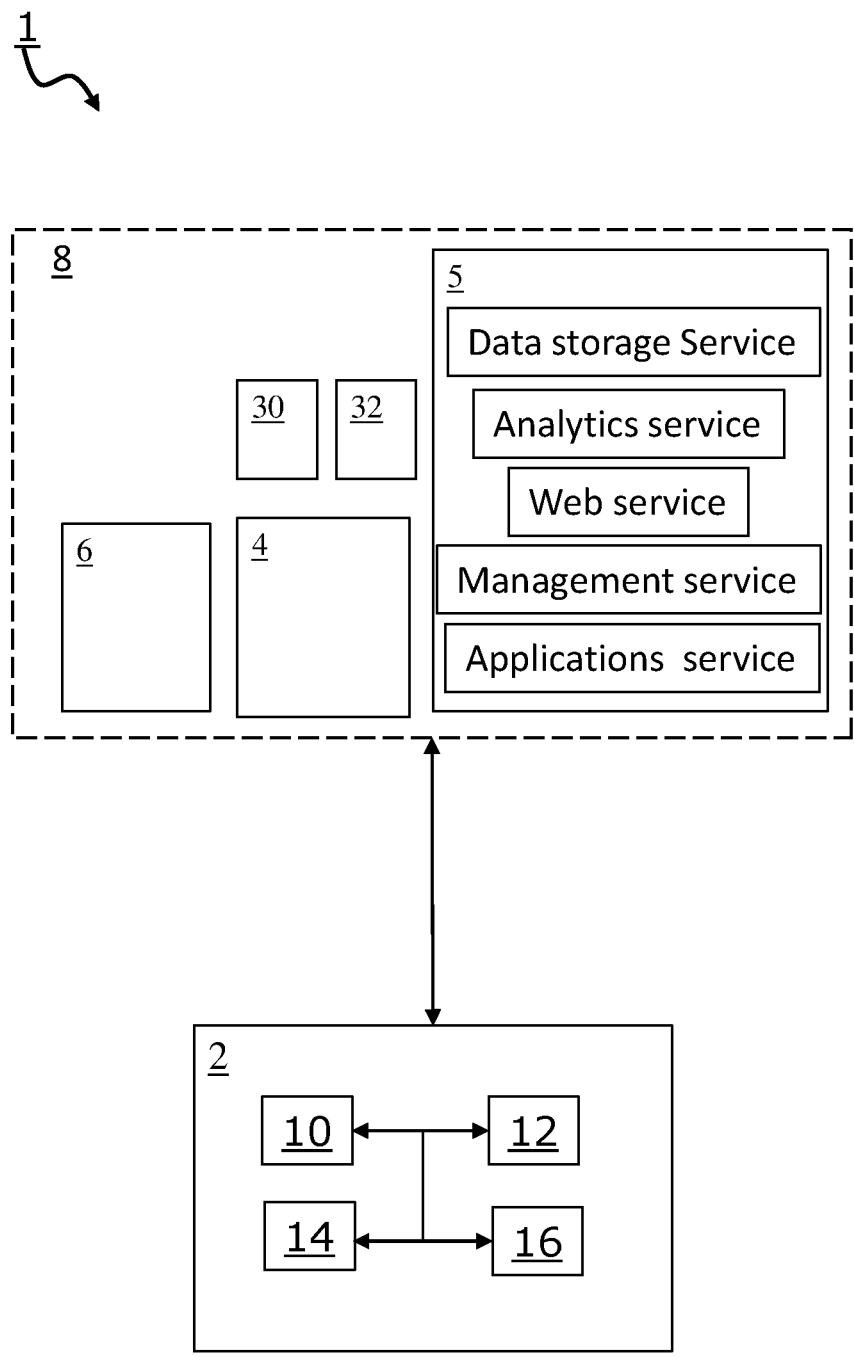
FIG. 1 shows an example deployment scenario for a device according to the present techniques.

FIG. 1 shows a deployment scenario 1 for a device 2 according to the present techniques.

Device 2 may be a computer terminal, a laptop, a tablet or mobile-phone, or may, for example, be a lightweight M2M (LwM2M) device running a LwM2M client. Device 2 can be used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services.

As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks In the present figures server 4 may, for example, be a LwM2M server, an application server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures server 6 comprises a bootstrap server which is used to provision resources at the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.).

In the present examples, the server 4, bootstrap server 6 and/or services 5 are depicted as being part of a device management platform 8, such as the Pelion™ device management platform from Arm®, Cambridge, UK.

The device 2 comprises communication circuitry 10 for communicating with the one or more servers 4 and/or services 5.

The communication circuitry 10 may use wireless communication such as, for example, one or more of: Wi-Fi; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource-constrained devices and supports the methods of GET, POST, PUT, DELETE, which can be mapped to methods of the HTTP protocol.

M2M communications are typically required to be secure to reduce the risk that malicious third parties gain access to the data, or to limit the access to data, by devices, servers or services. The device may use one or more security protocols to establish a communications path or channel for providing secure communications between entities. Exemplary security protocols may, for example, comprise Transport Layer Security (TLS) and Datagram Transport Layer Security (DTLS), whereby TLS/DTLS may be used to establish a secure channel between the device 2 and server 4 whereby TLS/DTLS include establishing communications using, certificates (e.g. X.509 certificates) and both pre-shared key and public key technology. The data (e.g. credential data) protected by TLS/DTLS may be encoded as plain text, binary TLV, JSON, CBOR, or any other suitable data exchange format.

The device 2 further comprises processing circuitry 12 for controlling various processing operations performed by the device 2.

The device 2 may further comprise input/output (I/O) circuitry 14, such that the device 2 can receive inputs (e.g. user inputs, sensor inputs, measurement inputs etc.) and or generate outputs (e.g. audio/visual/control commands etc.).

The device 2 further comprises storage circuitry 16 for storing resources, such as credential data, whereby the storage circuitry 16 may comprise volatile and/or non-volatile memory.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enroll etc.) with one or more remote entities (e.g. a bootstrap server/server/services).

Figure 2A:
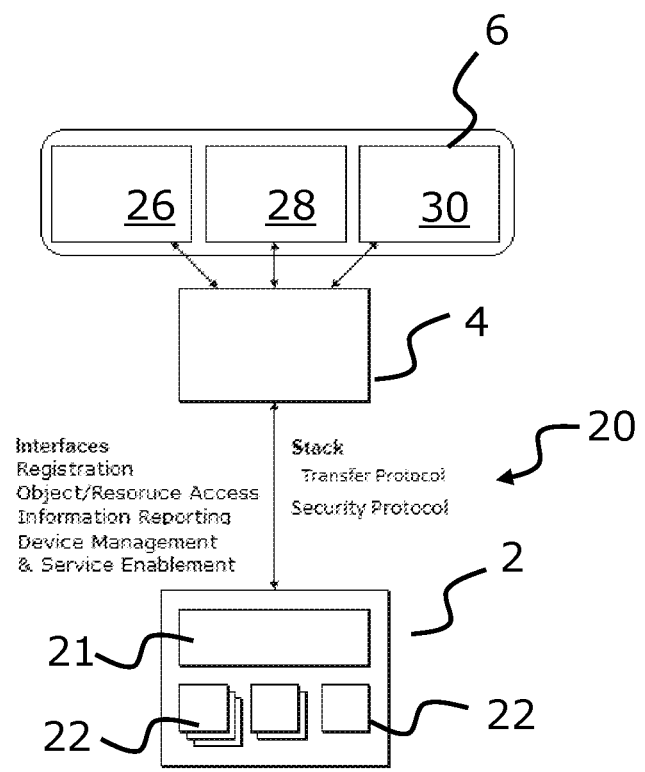
FIG. 2a shows an example architecture depicting a client-server relationship between the device of FIG. 1 and a server.
Figure 2B:
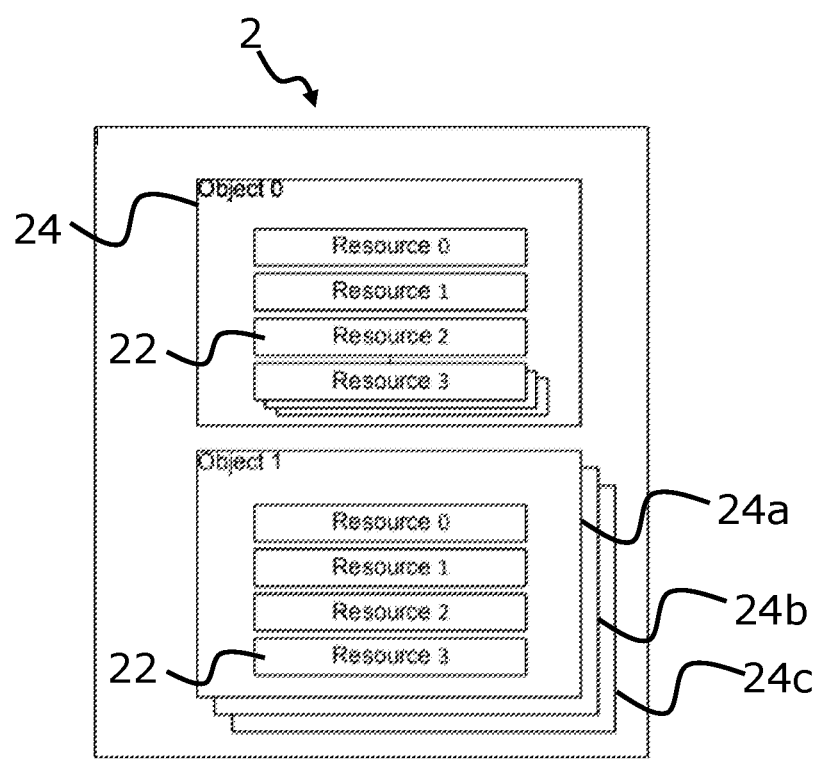
FIG. 2b shows a schematic diagram of an object model on the device of FIG. 1.

FIG. 2*a* illustratively shows an example architecture 20 which illustrates a client-server relationship between the device 2 and server 4. FIG. 2*b* illustratively shows a schematic diagram of an object model of device 2.

Device 2, which can register and communicate directly with the device management platform is hereafter referred to as "client device" but may also be referred to herein as a 'device', 'node device', 'node', 'end-user device' or 'user device'.

In the following examples the server 4 is depicted as a LwM2M server, such that the LwM2M server 4 and client device 2 communicate using suitable protocols, such as those in compliance with the Open Mobile Alliance (OMA) LWM2M specification although the claims are not limited in this respect.

The client device 2 comprises client 21 which may be integrated as a software library or a built-in function of a module and which is used in communications with the LwM2M server 4. The client 21 may be an LwM2M client.

Logical interfaces may be defined between the client 21 and LwM2M server 4, and three logical interfaces are depicted in FIG. 2, namely:

'Client Registration' interface may be used to perform and maintain registration with one or more LwM2M servers and de-register from one or more LwM2M servers.

'Device management and service enablement' interface may be used by one or more servers to access object(s), object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and LwM2M server 4 may be provided, for example, in accordance with the OMA LwM2M specification.

The device 2 comprises various resources 22, which can be read, written, executed and/or accessed by the LwM2M server 4 or one or more further servers/services.

As an illustrative example, a resource may comprise a value (e.g. generated by circuitry on the device). A web application may, via LwM2M server 4, request the value from the client device 2 (e.g. with a REPORT request), whereby the requested value is read and reported back to the web application by the LwM2M server 4.

As a further illustrative example, a resource may comprise credential data provisioned at manufacture (e.g. during a factory provisioning process) or during a communication session with a bootstrap server, and subsequently used to register with the LwM2M server 4.

As depicted in FIG. 2*b*, the resources 22 may be further logically organized into objects 24, whereby each device 2 can have any number of resources, each of which is associated with a respective object 24.

A set of objects on client device 2 may include, for example:

A 'security object' to handle security aspects between the client device 2 and one or more servers;

A 'server object' to define data and functions related to a server;

An 'access control object' to define for each of one or more permitted servers the access rights the one or more servers have for each object on the client device 2;

A 'device object' to detail resources on the client device 2. As an example, the device object may detail device information such as manufacturer, model, power information, free memory and error information;

A 'connectivity monitoring object' to group together resources on the client device 2 that assist in monitoring the status of a network connection;

A 'firmware update object' enables management of firmware which is to be updated, whereby the object includes installing firmware, updating firmware, and performing actions after updating firmware;

A 'location object' to group those resources that provide information about the current location of the client device 2;

A 'connection statistics object' to group together resources on the client device 2 that hold statistical information about an existing network connection.

In embodiments device 2 may have one or more instances of an object, three of which are depicted as 24, 24a and 24b in FIG. 2b. As an illustrative example, a temperature sensor device may comprise two or more temperature sensors, and the client device 2 may comprise a different device object instance for each temperature sensor.

In embodiments a resource may also comprise one or more resource instances which are depicted as 22, 22a, 22b in FIG. 2b.

In embodiments the objects, object instances, resources and resource instances are organised in an object hierarchy where each of the objects, object instances, resources and/or resource instances are elements of the object hierarchy, and whereby the device can enumerate the different elements of an object instance hierarchy using one or more characters (e.g. a text string; alphanumeric text, binary etc.)

Figure 2C:
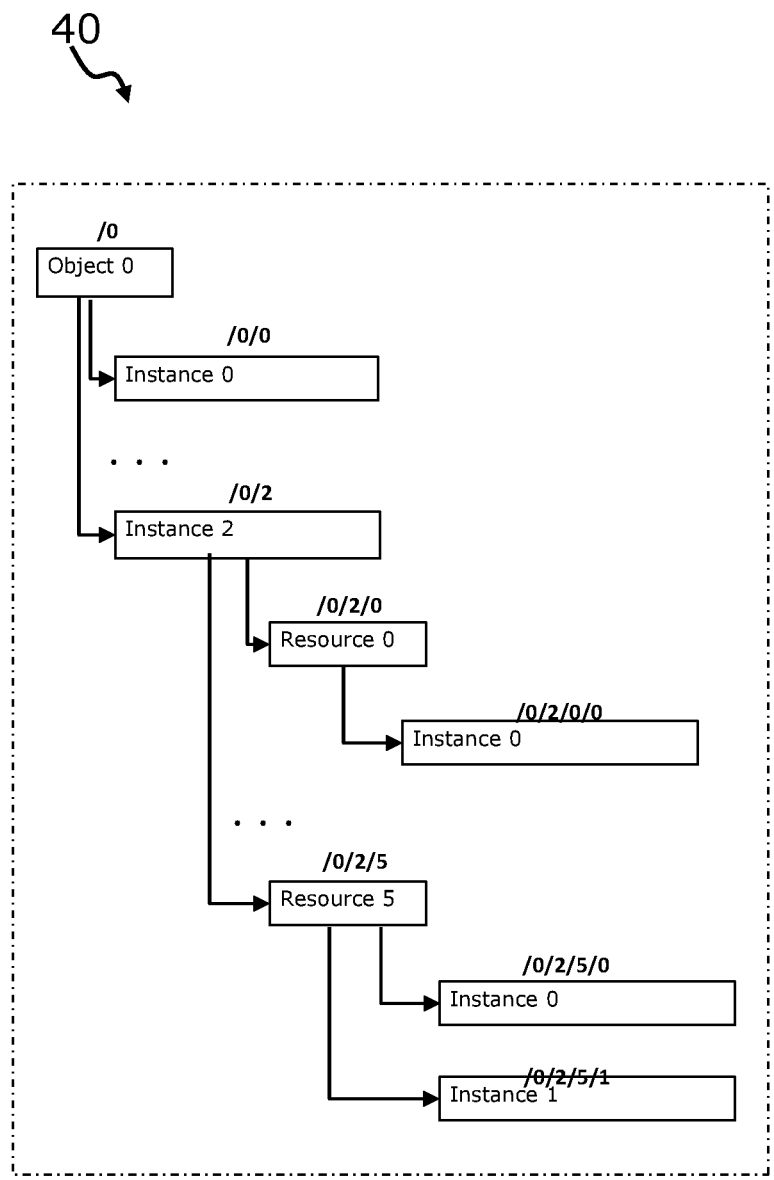

FIG. 2c shows one simplified example of a portion of such an object hierarchy 40, with omissions marked by elision marks ( ... ). In FIG. 2c, object 0 instance 2 is shown as having a single instance of resource 0 (that is, resource 0 instance 0), and two instances of resource 5 (that is, resource 5 instance 0 and resource 5 instance 1). The elements of the hierarchy are further marked with a hierarchy notation showing the levels and elements within levels using a slash separator. It will be clear to one of ordinary skill in the art that this is merely one example of a hierarchy notation and is not intended to limit the structure of the hierarchies available using the present techniques. It will also be clear to those of skill in the art that real-world implementations of such hierarchies will be much larger, and that only a very simple example has been shown here.

In the hierarchy shown in FIG. 2c, an object may represent an LwM2M object. Instances of such objects are created according to the requirements of the system being implemented. Thus, for example, in a system for monitoring heating and cooling in a group of buildings, a Temperature object may be defined having instances for each of the buildings. The Temperature object instances may be defined to comprise resources, such as a Current Temperature resource, a Maximum Temperature resource and a Minimum Temperature resource, and each resource may further comprise instances for various temperature sensors.

On registration with a server, a device may then enumerate those elements of an object hierarchy which are to be registered using a suitable identifier, such as a universal resource indicator (URI), in the form:

/{Object ID}/{Object Instance}/{Resource ID} e.g. /3/0/1.

As such, the objects, object instances & resources on a client device may be remotely accessed/managed by, for example, software hosted on a server (e.g. a bootstrap server, LwM2M server 4) or an application running as part of a service 5.

In an embodiment the LwM2M server 4 comprises, or has access to a resource directory (depicted as resource directory 30 in FIG. 1) at the device management platform 8 (as depicted in FIG. 1), whereby the resources of the various client devices registered with the LwM2M server 4 are stored in the resource directory 30.

Thus, the resource directory 30 is a registry of the elements of the object hierarchy on one or more client devices registered with one or more servers. In embodiments the resource directory 30 may be realized using a processor and a storing device such as a hard disc drive and a suitable application, a database application in a computer or it may be realized using cloud computing.

In an embodiment client device 2 registers with a LwM2M server 4 by sending a registration request and providing various data (e.g. in a TLS/DTLS handshake), such as providing all of the objects, object instances resources, and/or resource instances thereat (e.g. as a text string or individual identifiers). The LwM2M server 4 stores the identified objects, object instances, resources and/or resource instances in the resource directory 30 for the client device 2. Once the data is in the resource directory 30 the data can then be looked up and resources accessed as required.

As the number of objects, object instances, resources and/or resource instances on a client device increases, the size of the registration message will also increase and may impact the system capacity, especially when many client devices attempt to register with the LwM2M server 4 at substantially the same time.

To simplify the registration procedure and reduce the size of the registration request from a particular client device, the LwM2M server may use template-based registration, whereby the LwM2M server accesses resource templates which define objects, object instances and/or resources for a particular device type, or which may comprise a template identifier to identify a particular resource template. Such a template identifier may comprise a text string, a URI, a code, a bit flag or any suitable identifier to identify a resource template and the claims are not limited in this respect. A resource template is a template of at least two pre-determined objects, object instances, resources and/or resource instances. In embodiment a resource template is associated with a device type.

In the present specification, the "device type" is defined by the objects, object instances and resources at a device, whereby devices of the same device type will have the same objects, object instances and resources, whilst devices of a different device type will have different objects, object instances and resources. Moreover, the objects, object instances and resources may have different values on each device. As an illustrative example, a first device having a first set of resources will be a different device type to a second device having a second set of resources, the second set of resources having at least one additional or alternative resource than the first set of resources.

Referring again to FIG. 1, resource templates may be stored in storage 32 on the device management platform 8, hereafter "template storage" 32.

In an illustrative example, when a client device 2 registers with the LwM2M server 4 and the objects, object instances, resources and/or resource instances at that device 2 match the objects, object instances, resources and/or resource instances specified in a resource template in template storage 30, the LwM2M server 4 can store the objects, object instances, resources and/or resource instances identified in the resource template in the resource directory 30 to register that client device 2 at the device management platform 8.

In such a scenario the client device 2 can identify the resource template by providing a template identifier in the registration request, where the template identifier may be provisioned on the client device 2 by bootstrap server 6 during a bootstrap process. Such functionality means that the client device 2 is not required to provide all of its objects, object instances, resources and/or resource instances to the LwM2M server 4, rather it just transmits a template identifier to provide for template-based registration.

The present techniques provide for the device management platform to determine whether a resource template is available for a client device, and to generate resource templates when appropriate.

In embodiments, some devices may not communicate directly with servers and services at the device management platform 8. For example, when a device does not have the necessary capabilities (e.g. not IP-enabled to access the device management platform on the internet; the communication interface may not supported by the device management platform; the device does not have the necessary credential data to communicate with the device management platform), then the device can communicate indirectly with the device management platform via the intermediary device, and the device management platform can communicate with the device management platform. In such a scenario the device management platform will be required to be aware of what object(s), object instance(s) and/or resources are on the device in order to communicate therewith and access the functionality as required.

FIG. 3 illustratively shows an example of an intermediary apparatus 40 which provides communication between devices 2A, 2B 2C in a first network 38 (e.g. a home environment) and device management platform 8, which may operate across one or more different networks (e.g. the internet or cloud). Intermediary apparatus 40 (hereafter "gateway") may comprise a proxy server; edge device; application layer gateway; access device; a firewall; a mobile phone or any suitable computing device.

In accordance with the present disclosure, a device which is not capable of communicating directly (or registering with) with a device management platform is referred to as a "legacy device" or "unsupported device". A legacy device may not be capable of communicating directly with the device management platform because, for example, it does not support cryptographic communications as may be required by the device management platform; it may not have the appropriate communication protocols; it is not within range to communicate with the device management platform; it may not be capable of running an LwM2M client. It will be appreciated that these examples of why a legacy device may be required to communicate with a device management platform via a gateway are not intended to be limiting.

Gateway 40 comprises a protocol translator 42 which converts messages of one or more protocols from legacy devices 2A-2C to messages of one or more protocols supported by the device management platform 8, which can be processed by servers/services on the device management platform 8. As an illustrative example, the protocol translator 42 may translate a BLE message that uses a remote procedure call (RPC) mechanism from legacy devices 2A-2C in a first network 39 to RESTful messages for an LwM2M server 4 in a different network 38. Similarly, a message from the LwM2M server 4 may be translated to a corresponding BLE message for the legacy devices 2A-2C.

As depicted in FIG. 3, gateway 40 comprises a local resource directory 30A to register legacy devices locally and local template storage 32A, although these are optional and the gateway 40 may instead access the resource directory 30 and template storage 32 at the device management platform 8.

In embodiments the gateway 40 may register with the device management platform 8 to receive the necessary credential data to enable the gateway 40 to communicate therewith, and to enable the gateway 40 to register legacy devices therewith.

FIG. 4 illustratively shows an example of a gateway 40 registering with the device management platform 8 (e.g. via a server or service).

As depicted in the registration process 200 in FIG. 4, at S202 the gateway 40 registers with the device management platform 8 (e.g. via a server or service), whereby the gateway 40 may provide identifiers for all object(s), object instance(s) and resource(s) thereon such that the resource directory 30 may be updated with identifiers for the gateway 40.

At S204 the device management platform 8 determines an authorisation status for the gateway 40 based on the identifiers provided.

The authorisation status may be based on the gateway being capable of establishing secure communications with the device management platform (e.g. using TLS/DTLS). For example when the gateway can establish secure communications with the device management platform it may be taken to have an authorised status, and may be provided with access to data at the device management platform; when the gateway 40 cannot establish secure communications with the device management platform it may be taken to have an unauthorised status, and may be blocked from accessing data at the device management platform. In embodiments, the authorisation status may comprise different levels of authorisation which may affect what data the gateway can access at the device management platform. For example, when the gateway uses symmetric cryptography it may have a first authorisation status which enables it to access a first set of data; and when the gateway uses asymmetric cryptography it may have a second authorisation status which enables it to access the first set and a different set of data.

At S206, after establishing a secure communication session with the device management platform, the gateway 40 is provisioned with data (e.g. credential data, URIs etc.) to enable the gateway to communicate with one or more legacy devices. The data provisioned may be dependent on the authorisation level, whereby, for example, a gateway having a higher authorisation level may be enabled to communicate with a larger number of legacy devices in comparison to a gateway having a lower authorisation level.

The legacy device 2A-2C may be provisioned with credential data to communicate with the gateway 40. Such credential data may, for example, be provisioned, for example during a bootstrap process and/or by a user or engineer when adding a legacy device to a network.

FIG. 5a shows an example of a template-based registration process 300A between legacy device 2A and the gateway 40, whereby gateway 40 does not initially have access to a resource template for the legacy device.

At S302A legacy device 2A provides one or more device identifiers to the gateway 40, such that the gateway 40 determines the device type of legacy device 2A based on or in response to the device identifiers. The device identifiers may be provided to the gateway 40 during a TLS/DTLS handshake to establish a secure communications session, or in one or more messages after secure communications session is established.

The device identifiers comprise any information to allow the gateway 40 to determine the device type of the legacy device. Such device identifiers may, for example, include one or more of: a manufacturer identifier; a manufacturer hardware identifier; a device class identifier; a firmware version identifier; a security identifier; and a communication type identifier. It will be appreciated that this list provides illustrative examples, and any suitable device identifier(s) may be used.

At S304A the gateway 40 determines whether a resource template for the device type is available thereto (e.g. on local template storage), and when not, at 5306A requests the resource template from the device management platform 8 e.g. by transmitting the legacy device's device identifiers thereto.

At S308A, the device management platform 8 determines whether the requested resource template for the device type is available based on or in response to the device identifiers. The device management platform 8 may also determine whether the gateway 40 is authorised to access the requested resource template (e.g. based on or in response to the credential data provided at S202).

If a resource template for the device type is not initially available, a server or service at the device management platform 8 may, as at S309A, generate the resource template and store it in template storage thereat.

At S310A, when the requested resource template is available (and the gateway is authorised) the device management platform 8 provides it to the gateway 40, and at S312A the gateway stores the resource template in local template storage, and stores the object(s), object instance(s) and/or resource(s) defined by the resource template in the local resource directory associated with the legacy device 2A, thereby registering the legacy device 2A.

When the resource directory is updated, the gateway 40, at S314A, confirms registration to the legacy device and may provide the template identifier thereon for future template-based registrations with the gateway.

At S316A gateway 40 confirms the registration to the device management platform 8. At S318A, the device management platform may update the resource directory thereon with the object(s), object instance(s) and/or resource(s) defined in the resource template previously provided to the gateway 40 (or with additional or alternative resources identified by the gateway 40).

The legacy device 2A can then communicate with servers/services at the device management platform 8 via the gateway 40. The device management platform 8 can also access the legacy device 2A via the gateway 40.

Such functionality means that a device management platform can generate and/or provision template information on an intermediary apparatus to enable the intermediary apparatus perform template-based registration and register the legacy device, without the legacy device having to send all of the identifiers for the individual object(s), object instance(s) and/or resource(s) thereon.

In embodiments, when the required template resource is not available to the gateway 40 (e.g. it was deemed not authorised by the device management platform, or it did not exist), the gateway 40 may request that the legacy device provide all of the identifiers for the individual object(s), object instance(s) and/or resource(s) thereon (or data to enable identification of object(s), object instance(s), resource(s) and/or resource instance(s)), and the gateway will update the local resource directory accordingly. The gateway 40 may also send the identifiers for the legacy device's object(s), object instance(s) and/or resource(s) to the device management platform to register the legacy device thereat. However, such functionality places a processing/communications burden on the legacy device and gateway.

FIG. 5B shows an example of a template-based registration process 300B between legacy device 2A and the gateway 40, whereby the gateway 40 does not have access to a resource template for the legacy device 2A.

At S302B legacy device 2A provides one or more device identifiers to the gateway 40, such that the gateway 40 determines the device type of legacy device 2A based on or in response to the device identifiers. The device identifiers may be provided to the gateway 40 during a TLS/DTLS handshake to establish a secure communications session, or in one or more messages after secure communications session is established.

At S304B the gateway 40 determines whether a resource template for the device type is available thereto (e.g. on local template storage), and when not, at S306 requests the resource template from the device management platform 8 e.g. by transmitting the device identifiers thereto.

At S308B, the device management platform 8 determines whether the requested resource template for the device type is available and, when not available, the device management platform 8, at S310, indicates to the gateway 40 that the requested resource template is not available.

At S312B, rather than requesting the legacy device to provide all of the identifiers for the individual object(s), object instance(s) and/or resource(s), the gateway 40 generates the resource template based on or in response to the one or more device identifiers and stores the resource template in local template storage. At S313B the gateway stores the object(s), object instance(s) and/or resource(s) defined in the resource template in the local resource directory, thereby registering the legacy device 2A.

When the resource directory is updated, the gateway 40, at S314B, confirms registration to the legacy device S314 and provides the template identifier thereon for future template-based registrations with the gateway 40.

At S316B confirms the registration to the device management platform 8 and may provide the resource template. At S318B, the device management platform may update the resource directory thereon with the object(s), object instance(s) and/or resource(s) defined in the resource template.

The legacy device 2A can then communicate with servers/services at the device management platform 8 via the gateway 40. The device management platform 8 can also communicate with the legacy device 2A via the gateway 40.

Such functionality means that an intermediary apparatus can generate the necessary resource template and provision it to the device management platform for template-based registration, thereby avoiding the need for the legacy device to send all identifiers for the individual object(s), object instance(s) and/or resource(s). Such functionality also avoids the intermediary apparatus sending the object(s), object instance(s) and/or resource(s) identifiers to the device management platform every time a device of the same device type registers therewith.

FIG. 6 shows an example of a template-based registration process 400 between legacy device 2B and the gateway 40, whereby gateway 40 does have access to a resource template for the legacy device.

At 402 legacy device 2B provides one or more device identifiers to the gateway 40, such that the gateway 40, at S404, determines the device type of legacy device 2B based on or in response to the device identifiers. As above, the device identifiers may be provided to the gateway 40 during a TLS/DTLS handshake to establish a secure communications session, or in one or more messages after secure communications session is established.

At S406 the gateway 40 determines whether a resource template for the device type is available thereto (e.g. on local template storage), and when it is, the gateway 40 stores the object(s), object instance(s) and/or resource(s) defined in the resource template in the local resource directory to register the legacy device 2B.

When the local resource directory is updated, the gateway 40, at S408, confirms registration to the legacy device 2B and provides the template identifier thereon for future template-based registrations with the gateway 40.

At S410 confirms the registration to the device management platform 8 and provides a template identifier to identify the resource template used to register the device.

At S412, the device management platform obtains the resource template corresponding to the template identified and updates the resource directory thereon with the object(s), object instance(s) and/or resource(s) defined in the resource template to register the device.

When the resources of the legacy device 2B are known to the gateway 40 and device management platform 8, the legacy device 2B can then communicate with servers/services at the device management platform 8 via the gateway 40. The device management platform 8 can also communicate with the legacy device 2B via the gateway 40.

As the gateway 40 can access the resource template locally, and provide a template identifier to the device management platform to identify the resource template used to register the device, the messages between the gateway and the device management platform can be reduced in comparison to when the gateway is required to provide all of the identifiers for the individual object(s), object instance(s) and/or resource(s) thereon.

Object(s), object instance(s) and/or resource(s) on legacy devices may change over time (e.g. due to firmware updates or hardware modifications), and therefore, the device type will also change. As such, when a legacy device is updated and its device type changes, the resource template used previously will now longer cover all object(s), object instance(s) and/or resource(s) for the new device type, and the legacy device may provide the additional or alternative resources each time as part of a registration message, the intermediary apparatus or device management platform can generate a new resource template for the new device type based on the device identifiers.

In some embodiments, the intermediary apparatus may request updates to the resource templates from the device management platform, so that the resource templates are available when device of a new device type attempt to register with the intermediary apparatus.

Additionally, or alternatively, the device management platform, may provision resource templates on the intermediary apparatus for legacy devices registered thereat which are due to be updated in the future. As an illustrative example, the device management platform may provision update data (e.g. a firmware update) on an intermediary apparatus to send to one or more legacy devices and may further provide the resource templates/or template identifiers for the new device types resulting from the updates.

Such functionality means that the intermediary apparatus will have access to the resource templates (either locally or at the device management platform using the template identifiers), so can retrieve the object(s), object instance(s) and/or resource(s) from the resource templates without the legacy device having to provide identifiers for the individual object(s), object instance(s) and/or resource(s) on the legacy device.

FIG. 7 shows an example process 500 of a device management platform 8 provisioning resource templates or template identifiers on a gateway 40.

At S502, the gateway 40 requests to be notified/sent any updates to resource templates. Such a request may be in the form of a subscription request, or the gateway may transmit requests (e.g. periodically every day, week, month etc.). It will be appreciated that the subscription/requests may be optional and the device management platform 8 may transmit the updates to the gateway 40 without receiving such a subscription/request.

At S504 the device management platform 8 determines that one or more legacy devices registered at the gateway 40 have been (or are due to be) updated resulting in a new device type.

At S506 the device management platform 8 obtains a new resource template for the updated device type, and, at S508, transmits the new resource template or a template identifier therefor to the gateway 40.

At S510, the gateway 40 stores the template information in storage thereat to be used in future registrations with legacy devices of the updated device type.

At S512, in some embodiments the gateway 40 may provision the template identifier on the legacy device 2A before the update for use in template-based registration after the update. Alternatively, the gateway 40 may provision the template identifier on the legacy device 2A' after the update is complete (e.g. during a first registration with the gateway after the update).

The present template-based registration techniques described above, whereby resource templates are available to a gateway, provide for reduced registration messages between devices and the gateway.

FIGS. 8a and 8b illustratively show an example of a data structure 50 which may be used by the device management platform (e.g. a server or service) to generate resource templates and/or to assign template identifiers to resource templates. Additionally, or alternatively, the data structure may be used to identify which object(s), object instance(s) and/or resource(s) are within a particular resource template based on or in response to a received template identifier.

As illustratively depicted in FIGS. 8a and 8b, the data structure 50 is representative of all resources available to the device management platform and is structured in a hierarchical manner, whereby the root node 52 represents the set of available resources. In other embodiments the data structure may be representative of a subset available to the device management platform.

Object nodes 54 each represent a subset of the resources of the root node 52.

Object instance nodes 56 each represent a subset of the resources of the respective object nodes 54.

Resource nodes 58 each represent a subset of the resources of the respective object instance nodes 56. A further branch may originate from the respective resource to provide resource instance nodes (not shown in FIG. 8a or 8b).

Each branch of the data structure 50 comprises a group of object(s), object instance(s) and/or resource(s) and is allocated a different group identifier (B). The group identifiers (B) are depicted as being alphanumeric values in FIG. 8a, although the claims are not limited in this respect.

In an embodiment the group identifiers for a branch may be generated by the device management platform (e.g. a server or service thereat) by applying a data reducing function to all the resources of the respective nodes of that branch (e.g. by applying the data reducing function to all identifiers of the resources). In an embodiment the data reducing function is a compression function such as run-length encoding (RLE), Huffman encoding and/or Lempel-Ziv compression. In a further embodiment the data reducing function is a hashing function such as MD5, SHA, Adler32 Checksum etc. Such hashing functions may be one-way hashing function.

In an embodiment, the data structure with pre-calculated group identifiers may be provisioned on the gateway. Additionally, or alternatively, the gateway may generate the data structure itself or a part thereof, whereby it may be provisioned with instructions on how to generate the data structure (or part thereof) and how calculate the group identifiers. Such instructions may be provisioned by the device management platform.

The legacy device may be provisioned with pre-calculated group identifier(s) for objects, object instances and/or resources thereon via the gateway. Additionally, or alternatively, the legacy device may be provisioned with the data structure or a part thereof.

In an embodiment, when generating a registration message, the legacy device may use the pre-calculated group identifiers as a template identifier in the registration message. Such functionality reduces the computational/processing burden on legacy devices in comparison to having to generate the respective template identifiers.

In another embodiment, the gateway may provision the legacy device with data to generate one or more group identifiers by performing the same data reducing function on the respective object(s), object instance(s) and/or resource(s) as used by the device management platform or gateway to calculate the group identifiers in data structure 50. The one or more group identifiers may then be used as a template identifier in the registration message. Such functionality reduces the size of the registration message as the devices do not have to transmit individual identifiers for all the object(s), object instance(s) and/or resource(s).

On receiving a registration message comprising a template identifier corresponding to one or more group values, the gateway can determine the objects, object instances and resources required for registration of a legacy device based on or in response to the template identifier.

In embodiments, different legacy devices can provide different template identifiers in the respective registration messages and the receiving gateway can determine which object(s), object instance(s) and/or resource(s) are required to register each of the different legacy devices based on or in response to the template identifiers provided.

As an illustrative example, legacy devices 2A and 2B could both implement resources identified by group identifiers "B=454s" and "B=afsas" and include these group identifiers as a template identifier in the registration message. Similarly, both legacy devices could require resources from different sub-branches and include the group identifiers for the different sub-branches in the template identifier.

In a further embodiment object(s), object instance(s) and/or resource(s) available to the device management platform may be grouped together other than by branches of the data structure.

As depicted in FIG. 8b, the object(s), object instance(s) and/or resource(s) in data structure 50 are grouped and identified by a group identifier (G), where group identifier "G=uio6" corresponds to all objects from object 20 to object 250; group identifier "G=YT" corresponds to object instances 1 and 2 of object 10420; template identifier "G=u897" corresponds to object instance 3 of object 20 and object instance 1 of object 9000; group identifier "G=uio6" corresponds to all objects from object 250 to object 10420; and template identifier "G=YUt6" corresponds to the resources of object 20 and object 10420. The groups depicted in FIG. 8b are illustrative only and any number or selection of groupings may be assigned. As depicted in FIG. 8b, a group may have one or more overlapping elements with another group.

As above, the group identifiers may be calculated by the device management platform (e.g. a server or service thereat) by applying a data reducing function to the resources of the objects, object instances, resources assigned to each group (e.g. by applying the data reducing function to the identifiers of the respective object(s), object instance(s) and/or resource(s)).

The object(s), object instance(s) and/or resource(s) may be grouped in any suitable manner. For example, each group may correspond to object(s), object instance(s) and/or resource(s) of known device type. In other embodiments, the object(s), object instance(s) and/or resource(s) may be assigned to a group based on new device types resulting from future updates. In an embodiment object(s), object instance(s) and/or resource(s) may be assigned to a group based on the frequency the object(s), object instance(s) and/or resource(s) are used to register legacy devices. For example, the most commonly used object(s), object instance(s) and/or resource(s) can be grouped together.

Such functionality means that multiple legacy devices can be provided with template identifiers for resource identifiers common to all legacy devices, whilst the individual devices can customise the registration message to provide further groups within the respective template identifiers to cover the additional or alternative object(s), object instance(s) and/or resource(s) required for registration.

A template identifier in a registration message from a legacy device may correspond to one or more group identifiers as part of a registration message, and, therefore, a receiving gateway or device management platform can determine which object(s), object instance(s) and/or resource(s) are required to register the legacy device based on or in response to the template identifier.

Thus, the data structure provides for a reduction in the computational/processing burden on the device management platform because once the group identifiers are generated, they can be stored and looked-up for each device registration and will not be required to be regenerated until they are updated or modified.

As above, in embodiments one or more object(s), object instance(s) and resource(s) on a legacy device may change over time (e.g. following a firmware update), thereby changing the device type of that legacy device. Accordingly, the device management platform may dynamically learn the group identifiers and deliver them to the gateway in advance of the device type changing. Such dynamic learning may be based on customer/user/administrator input-configurations, device types being connected to the other gateways associated with the customer account, geographical cues etc. although the claims are not limited in this respect.

The present template-based registration techniques provide for reduced registration messages between the gateway and a device management platform to which the devices require access because the gateway can indicate which object(s), object instance(s) and/or resource(s) are on a particular device without having to the provide individual identifiers for the respective object(s), object instance(s) and/or resource(s).

In other embodiments the template identifier may comprise code, such as binary code (e.g. from 1 bit to n-bits) to identify the object(s), object instance(s), resource(s) and/or resources instances(s) required for registration.

As an illustrative example, the gateway or device management platform may be configured to apply a data reducing function to one or more object(s), object instance(s), resource(s) and/or resources instances(s) to generate a resource template comprising a bit stream or bit string, whereby each bit is representative of an object, object instance, resource or resource instance. For example, when a bit in the bit stream of a resource template is set to a value of '1' the device has that corresponding object, object instance, resource or resource instance (i.e. the value '1' is taken to indicate the presence of the corresponding object, object instance, resource or resource instance at the device); and when the bit is set to a value of '0', then the device does not have that corresponding object, object instance, resource or resource instance. (i.e. the value '0' is taken to indicate the absence of the corresponding object, object instance, resource or resource instance from the device).

The group identifiers described above in FIGS. 8a & 8b may also be identified by one or more bit values, whereby the gateway will identify the required resources for the device based on the bit values.

For example, the most commonly requested objects, object instances or resources for devices may be grouped together and identified with a group identifier comprising a single bit. The next most commonly requested objects, object instances or resources for devices may be grouped together and identified with two bits and so on. Similarly, the most commonly requested branch in the data structure may be identified with a group identifier comprising a single bit. The next most commonly requested branch may be identified with a group identifier comprising two bits and so on.

When a device has objects, object instances or resources corresponding to a particular group(s) the gateway will parse the template identifier and identify which object(s), object instance(s) or resource(s) are required to register the device.

As an illustrative example, each bit in the bit string may correspond to a particular object, object instance, resource or group. Such functionality means that an object, object instance, resource and/or group can be identified with one or more bits.

As a further illustrative example, each object, object instance, resource and/or group may be defined by a bit code (e.g. 2 or more bits), such that when a device requires one or more objects, object instances, resources and/or groups on registration it will include that bit code in the registration message as a template identifier.

Devices of a first device type may require some or different object(s), object instance(s) and/or resources more frequently than devices of a second device type (e.g. chemical sensors). Thus, the objects, object instances and/or resources may be grouped differently, or the group identifiers assigned differently dependent on the devices.

Thus, the device management platform may determine which group identifiers to use, whilst the gateway will be provisioned with the appropriate data to generate the required resource template in response to a template identifier.

In an embodiment, to reduce the size of the registration message the legacy device may be configured to generate a unitary compressed expression encapsulating, in a single expression, two or more objects, object instances, resources and resource instances to be used to register the device. Similarly, the gateway may include such a unitary compressed expression when communicating with the device management platform and vice versa.

As an illustrative example, a message from the device to the gateway may include a unitary compressed expression comprising a wildcard symbol, thus making the gateway operable to respond to any activity associated with any of the elements of the object hierarchy that fall within the group specified by the wildcard symbol.

An illustrative example of a wildcard symbol includes the asterisk "*" which may be used by a device to request all object instances of an object, or all resources of an object (or object instance). The device may apply the data reducing function to provide a compressed expression in the form:

/3/0/*

The gateway would recognise the compressed expression to relate to all object instances and resources of object 3, object instance 0.

A further illustrative example of a wildcard symbol includes the question mark ? which may be used by a device to request particular objects, object instances, or resources. The device may apply the data reducing function to provide a compressed expression in the form:

/3/?/3

The gateway would recognise the compressed expression to relate to the resource 3 of any object instance of object 3.3

A further illustrative example of a wildcard symbol is the open and close brackets '[ ]' which may be used by a device to request particular objects, object instances, resources and/or resource instances in a range. The device may apply the data reducing function to provide a compressed expression in the form:

/3/0/[3-7]

The gateway would recognise the compressed expression to relate to all resources 3 to 7 inclusive, of object instance 0 of object 3.

The example compressed expressions are exemplary only, and any characters or symbols may be used to reduce a corresponding non-compressed expression.

In a further illustrative example, a message to the gateway may comprise a unitary compressed expression in the form of a regular expression defining the criteria to be met by an element that will make the device operable to respond to any activity associated with any of the elements that fall within those specified by the regular expression. For example, such a regular expression may specify a set of values identifying elements that have names containing a specified embedded string. A regular expression may comprise a specification of those parts of the definition of an object, object instance, resource or resource instance in the object hierarchy that are required to match the criteria, and it may contain indicators that some parts of the definition of an object, object instance, resource or resource instance in the object hierarchy are to be ignored. It will be clear to one of ordinary skill in the art that these are merely examples, and that the unitary compressed expression may take many other forms, according to the requirements of the application that is the consumer of the information provided by the device in response to activity associated with identifying elements of the device's object hierarchy to the gateway.

Using compressed expressions reduces the registration message in comparison to the device having to provide individual identifiers for all the object(s), object instance(s), resource(s) and/or resource instance(s) thereon to the gateway. Such functionality may be particularly useful when a gateway is not capable of using template based registration or is not authorised to access a resource template, and the device would otherwise be required to enumerate all of its object(s), object instance(s), resource(s) and/or resource instance(s) to the gateway.

The present template-based registration techniques also provide for the device management platform to register legacy devices using template information provided by a gateway without the gateway having to provide individual identifiers for the respective object(s), object instance(s) and/or resource(s) thereof.

Whilst the embodiments described above generally describe the gateway registering legacy devices not supported by the device management platform, supported client devices which can register directly with the device management platform may also register with the gateway in substantially the same manner as the legacy devices described above.

Given that trillions of devices are predicted to be used in IoT networks reducing the size of communications sent between devices, device management platforms and intermediary devices will reduce the processing, computational and/or storage burdens on those entities and the associated networks.

Embodiments of the present techniques may provide implementations which conform to the Open Mobile Alliance Lightweight Machine to Machine Technical Specification, Version 1.0 and to one or more revision(s) thereof, including, for example, Versions 1.0.2, 1.1 and 1.3. It will be appreciated that the claims are not limited in this respect.

Embodiments of the present techniques also provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method of template-based registration of a first device, the method comprising:
   receiving, from the first device at an intermediary apparatus in communication with the first device and a server, a registration request comprising one or more device identifiers for the first device;
   determining the availability of template information for the first device in storage at the intermediary apparatus
   when the template information for the first device is unavailable in storage at the intermediary apparatus:
      sending, from the intermediary apparatus to the server, a request for the template information for a first device type to enable the intermediary apparatus register devices corresponding to the first device type in a template-based registration,
      receiving, at the server from the intermediary apparatus, the request for template information, determining, at the server, whether the intermediary apparatus can be provided with the requested template information, and responsive to a determination that the intermediary apparatus can be provided with the requested template information, transmitting the requested template information to the intermediary apparatus;

registering, at the intermediary apparatus, the first device using the template information;

receiving, at the intermediary apparatus, communications from the registered first device;

sending, from the intermediary apparatus to the server, the communications received from the first device.

2. The method of claim 1 further comprising:
receiving, from the server, the template information.

3. The method of claim 1, wherein generating template information for the first device comprises:
determining a device type for the first device based on or in response to the one or more device identifiers; and,
generating the template information based on or in response to the device type.

4. The method of claim 1, wherein the template information comprises one or more of:
a resource template and an identifier for a resource template.

5. The method of claim 4, wherein the resource template defines the objects, object instances, resources and/or resource instances for the device type.

6. The method of claim 1 wherein registering the first device comprises:
storing all resources in the resource template of the first device in a resource directory.

7. The method of claim 6, wherein the resource directory is local to the intermediary device.

8. The method of claim 7, wherein the resource directory is remote from the intermediary device.

9. The method of claim 1, further comprising:
requesting updates to the template information.

10. The method of claim 9, further comprising:
receiving, from a server or service, updated template information.

11. The method of claim 10 further comprising:
receiving, from a second device, a registration request, wherein the registration request comprises one or more device identifiers for the second device; and,
registering the second device using the updated template information.

12. The method of claim 1, wherein:
the one or more device identifiers comprise one or more of: a manufacturer identifier; a manufacturer hardware identifier; a device class identifier; a firmware version identifier; a security identifier; and a communication type identifier.

13. The method of claim 1, wherein the device comprises a LwM2M device and/or wherein the server comprises a LwM2M server.

14. The method of claim 1, further comprising:
registering the first device using the template information.

15. The method of claim 1, wherein registering the first device comprises:
storing one or more of an object, object instance and resource defined by the template information for the first device in a resource directory at the intermediary apparatus to register the first device.

16. The method of claim 1, further comprising:
storing the template information in template storage at the intermediary apparatus.

17. The method of claim 1, wherein determining the availability of template information for the first device comprises:
determining the availability of template information for the first device in storage at the intermediary apparatus.

18. A computer implemented method comprising:
receiving, at a server from an intermediary apparatus, a request for template information for a first device type to enable the intermediary apparatus register devices corresponding to the first device type in a template-based registration;
determining, at the server, whether the intermediary apparatus can be provided with the template information;
responsive to a determination that the intermediary apparatus can be provided with the requested template information, transmitting the requested template information to the intermediary apparatus to enable the intermediary apparatus to register the first device thereat;
receiving, via the intermediary apparatus, communications from the first device when registered at the intermediary apparatus.

19. A non-transitory computer readable storage medium comprising code which when implemented on a processor causes the processor to carry out the method of claim 1.

20. A system comprising:
a server; and,
an intermediary apparatus;
wherein the server is to:
receive, from the intermediary apparatus, a request for template information for a device type to enable the intermediary apparatus register devices corresponding to the device type in a template-based registration;
determine whether the intermediary apparatus can be provided with the template information; and,
responsive to a determination that the intermediary apparatus can be provided with the requested template information, transmit the requested template information to the intermediary apparatus to enable the intermediary apparatus to register the first device thereat;
receive, via the intermediary apparatus, communications from a device of the device type when registered at the intermediary apparatus.

* * * * *